United States Patent
Miller et al.

[11] Patent Number: 6,123,167
[45] Date of Patent: Sep. 26, 2000

[54] ELECTRIC STEERING MOTOR WITH ONE-PIECE METAL SHELL

[75] Inventors: Joseph D. Miller, Farmington Hills; Paul K. Webber, Rochester Hills; Brett M. Swiss, Shelby Township, all of Mich.

[73] Assignee: TRW Inc., Lyndhurst, Ohio

[21] Appl. No.: 09/096,151

[22] Filed: Jun. 11, 1998

[51] Int. Cl.[7] ................................ B62D 5/04
[52] U.S. Cl. .......................... 180/444; 180/443
[58] Field of Search ........................... 180/443, 444, 180/446, 400; 310/52, 346, 64

[56] References Cited

U.S. PATENT DOCUMENTS

| | | | |
|---|---|---|---|
| 2,711,492 | 6/1955 | Ballman . | |
| 4,967,858 | 11/1990 | Kotake et al. | 180/444 |
| 5,029,659 | 7/1991 | Saito | 180/443 |
| 5,128,576 | 7/1992 | Obradovic . | |
| 5,555,951 | 9/1996 | Sugino et al. | 180/444 |
| 5,573,079 | 11/1996 | Suda et al. | 180/444 |
| 5,785,145 | 7/1998 | Wakao et al. | 180/443 |
| 5,810,111 | 9/1998 | Takeuchi et al. | 180/443 |
| 5,921,344 | 7/1999 | Boyer | 180/444 |
| 5,957,236 | 9/1999 | Kitazawa et al. | 180/444 |
| 5,975,234 | 11/1999 | Bugosh et al. | 180/444 |

FOREIGN PATENT DOCUMENTS

| | | |
|---|---|---|
| 60-154955 | 8/1985 | Japan . |
| 157962 | 4/1989 | Japan . |
| 333779 | 4/1991 | Japan . |

*Primary Examiner*—Daniel G. DePumpo
*Attorney, Agent, or Firm*—Tarolli, Sundheim, Covell, Tummino & Szabo L.L.P.

[57] ABSTRACT

A steering assembly (10) for turning steerable wheels of a vehicle in response to rotation of a steering wheel (12) includes a pinion (30). A steering member (14) is movable axially to effect turning movement of the steerable wheels of the vehicle. The steering member (14) has a rack portion (34) for engagement with the pinion (30) and an externally threaded screw portion (38). An electric motor (50) includes a rotor (132) drivingly connected to the steering member (14) and a stator (70). The stator (70) when energized effects movement of the rotor (132) and, thereby, rotation of the steering member (14). An electronic control unit (210) for helping to control operation of the electric motor (50) comprises at least one heat-generating component (220). A one-piece cast metal member (60) made of a homogeneous material has a main body portion (66) encapsulating and supporting the stator (70) and has an electronic control unit housing portion (102). The electronic control unit housing portion (102) of the one-piece metal member (60) includes a platform (94). The heat-generating component (220) is fastened to the platform (94) in a thermally conductive relationship.

12 Claims, 4 Drawing Sheets

ELECTRIC STEERING MOTOR WITH ONE-PIECE METAL SHELL

BACKGROUND OF THE INVENTION

1. Technical Field

The present invention relates to a vehicle power assist steering system. In particular, the present invention relates to an electric power assist steering system which includes an electric assist motor for applying force to a steering member, such as a rack.

2. Description of the Prior Art

A known type of vehicle power assist steering system includes a ball nut for transmitting force between a steering member and an electric assist motor. The steering system also includes an electronic control unit, or ECU, for controlling operation of the electric motor. Upon actuation of the electric motor, the ball nut is driven to rotate relative to the steering member. The rotational force of the ball nut is transmitted to the steering member to drive the steering member axially. Axial movement of the steering member effects turning movement of the steerable wheels of the vehicle.

The housing of the assist motor is typically machined from steel. The process of machining the housing is difficult and costly.

SUMMARY OF THE INVENTION

The present invention is a steering assembly for turning steerable wheels of a vehicle in response to rotation of a steering wheel of the vehicle. The steering assembly comprises a pinion and a steering member which is movable axially to effect turning movement of the steerable wheels of the vehicle. The steering member has a rack portion for engagement with the pinion and an externally threaded screw portion.

The steering assembly includes an electric motor comprising a rotor drivingly connected to the steering member and a stator, the stator when energized effecting rotation of the rotor and, thereby, movement of the steering member. An electronic control unit for helping to control operation of the electric motor comprises at least one heat-generating component.

A one-piece cast metal member made of a homogeneous material has a main body portion encapsulating and supporting the stator and has an electronic control unit housing portion. The electronic control unit housing portion of the one-piece metal member includes a platform. The at least one heat-generating component is fastened to the platform in a thermally conductive relationship.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
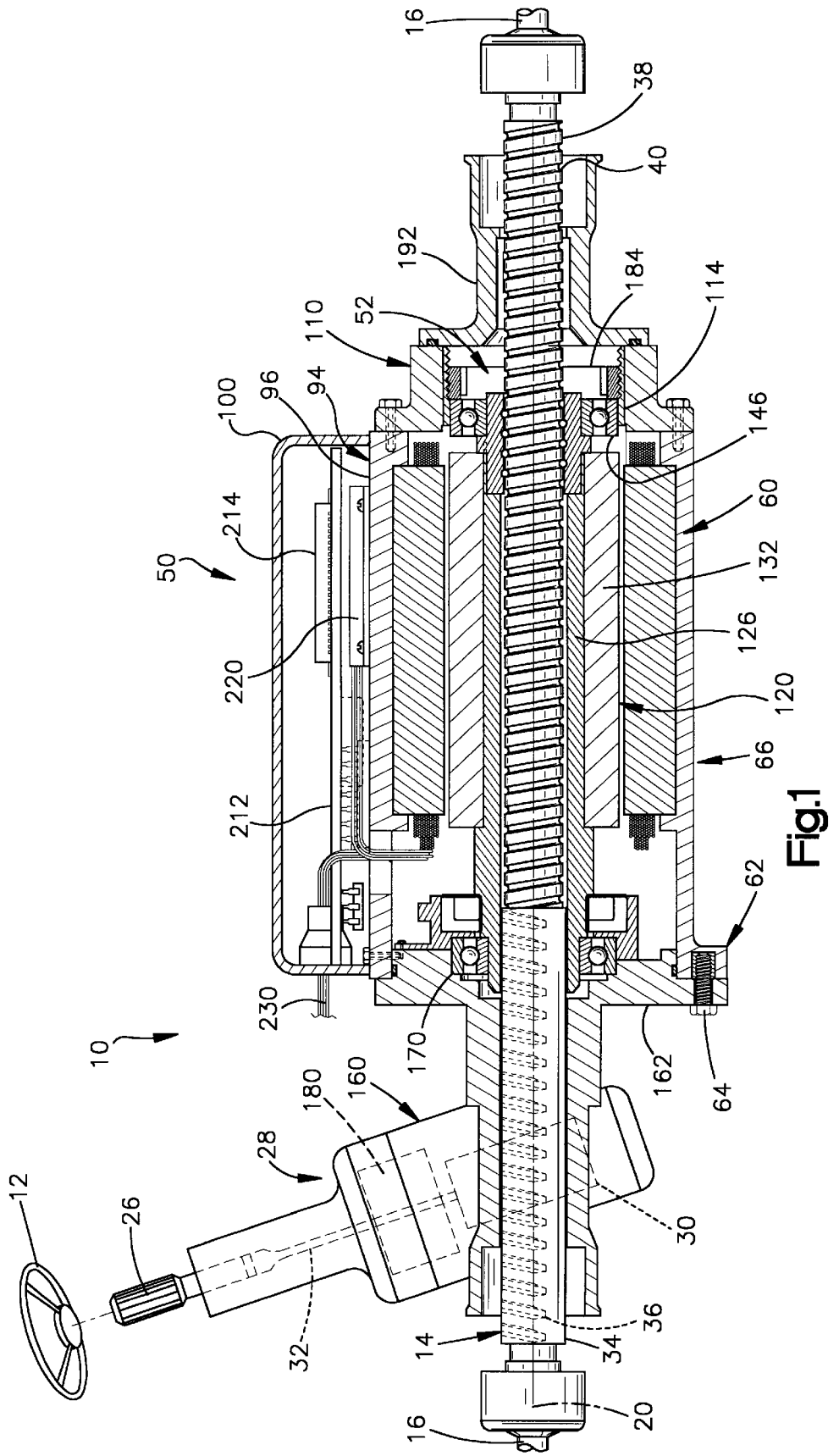
FIG. 1 is a view, partially in section, of a steering system in accordance with the present invention.

The present invention relates to a power assist steering system. In particular, the present invention relates to an electric power assist steering system which includes an electric assist motor for applying force to a steering member, such as a rack. As representative of the present invention, FIG. 1 illustrates a power assist steering system 10.

The steering system 10 includes a driver-operated steering wheel 12 operatively connected to a steering member 14. The steering member 14 is coupled with the steerable wheels (not shown) of a vehicle through tie rods 16. The steering member 14 extends along an axis 20 of the steering system 10.

The vehicle steering wheel 12 is connected for rotation with an input shaft 26 which extends into a pinion housing 28. The input shaft 26 is mechanically coupled by a torsion bar 32, in a known manner, to a pinion gear 30 located in the pinion housing 28.

The steering member 14 includes a first portion 34 having rack teeth 36 disposed thereon and a second portion 38 having an external screw thread convolution 40 axially spaced from the rack teeth. The rack teeth 36 on the steering member 14 are in meshing engagement with gear teeth (not shown) on the pinion gear 30.

The steering system 10 includes an electric assist motor 50, described below in detail, drivably connected to a ball nut assembly 52 for effecting axial movement of the steering member 14 upon rotation of the vehicle steering wheel 12. In the event of inability of the motor 50 to effect axial movement of the steering member 14, the mechanical connection between the gear teeth on the pinion gear 30 and the rack teeth 36 on the steering member 14 can effect manual steering of the vehicle.

The motor 50 includes a motor housing 60 which houses the other components of the motor. The motor housing 60 and the pinion housing 28, together, form a housing of the steering assembly 10.

The motor housing 60 is a metal member which is cast as one piece. A preferred material for the motor housing 60 is aluminum or an aluminum alloy. The motor housing 60 is cast as one homogeneous piece of metal.

The motor housing 60 has a first axial portion 62 which is disposed adjacent to the pinion housing 28 and the pinion 30. A plurality of mounting bolts 64 secure the first axial portion 62 of the motor housing 60 to the pinion housing.

A second axial portion 66 of the motor housing 60 encases a stator 70 of the motor 50. The second axial portion 66 of the motor housing 60 has a generally cylindrical configuration centered on the axis 20.

Figure 2:
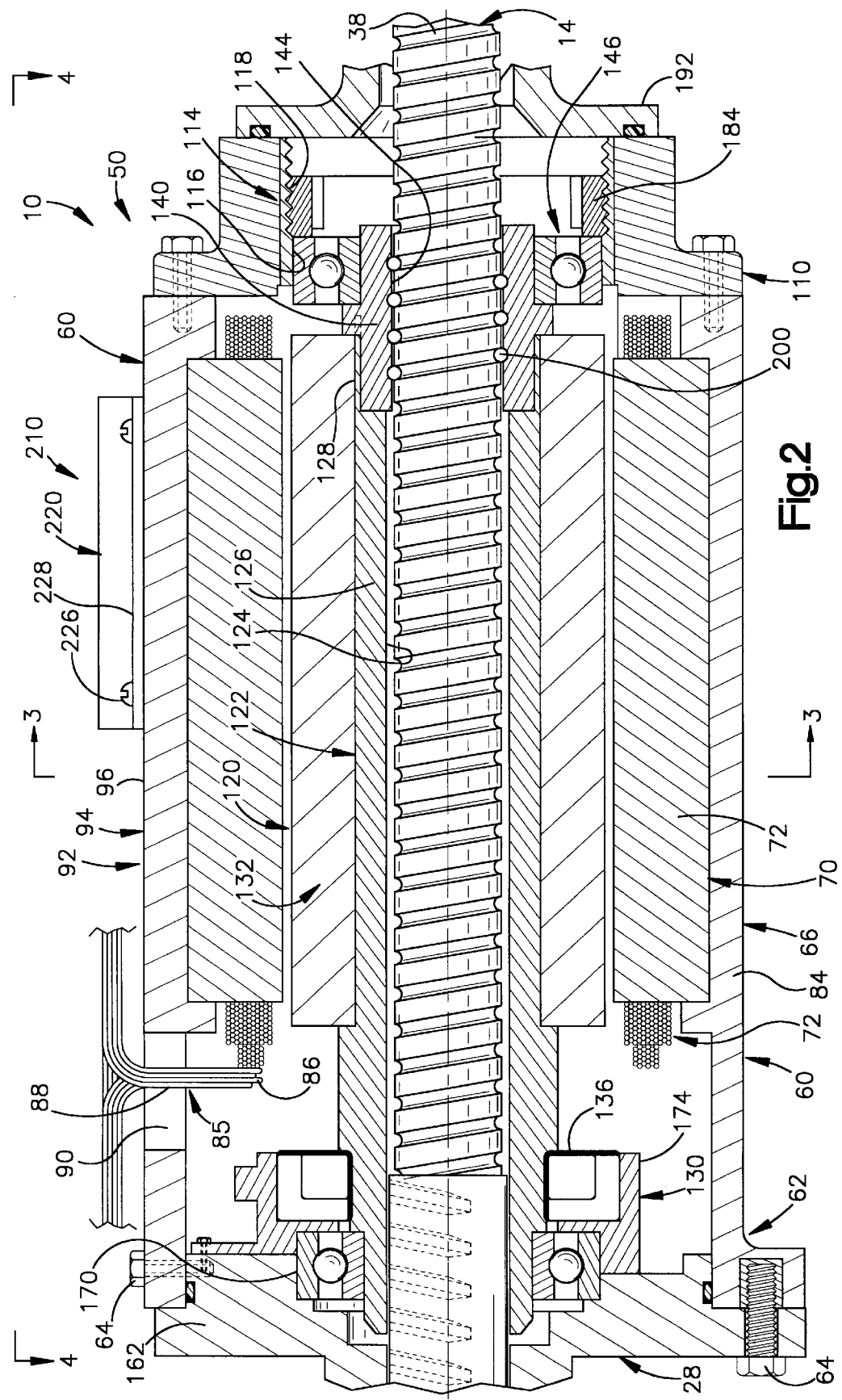
FIG. 2 is an enlarged view of a portion of the steering system of FIG. 1.
Figure 3:
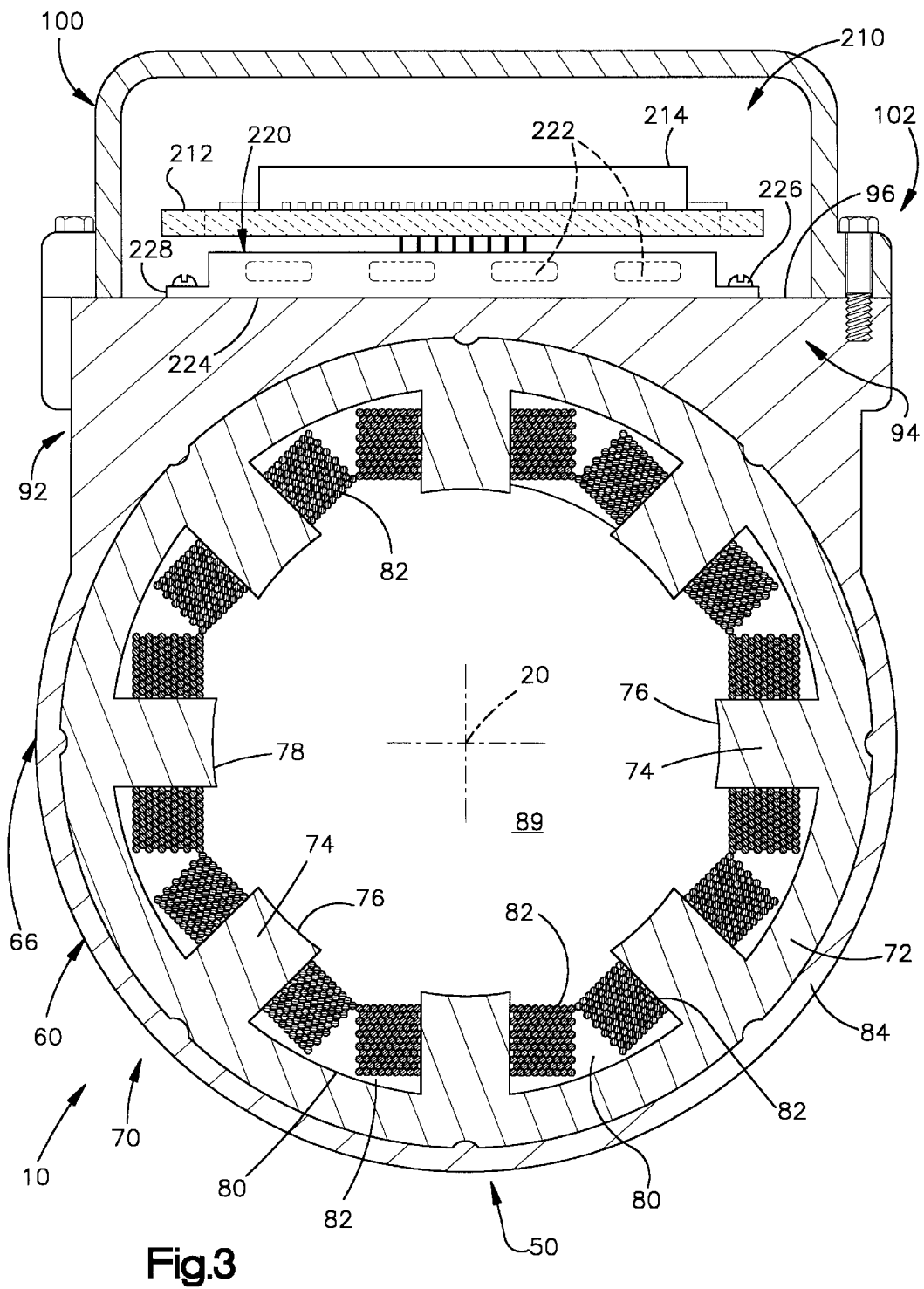
FIG. 3 is a sectional view of a motor stator which forms part of the steering system of FIG. 1.

The stator 70 includes a metal core 72 (FIGS. 2–3) formed of a plurality of stacked laminations which are laser welded together to form the core. The core 72 as thus formed has a plurality of axially extending ribs 74. The ribs 74 have cylindrical inner surfaces 76 which partially define a generally cylindrical inner surface 78 of the stator 70. The ribs 74 define a series of slots 80 in the stator 70. The stator 70 also includes a series of stator windings 82 disposed in the slots 80 in the core 72. The windings 82 form magnetic poles of the motor 50.

To form the motor housing 60, the stator core 72 alone, without the stator windings 82, is placed in a suitable mold (not shown) and molten aluminum is poured into the mold. The molten aluminum flows around and encases the stator core 72. The molten aluminum cools and solidifies to form the motor housing 60.

A portion of the motor housing 60 extends around the outer periphery of the stator core 72 to form an axially extending side wall 84 of the motor housing 60. The material of the side wall 84 fits intimately around the radially outer edges of the stacked laminations of the stator core 72. A portion of the casting mold (not shown) prevents the molten metal from flowing onto the inner surfaces 76 of the ribs 74 during formation of the motor housing 60.

Figure 4:
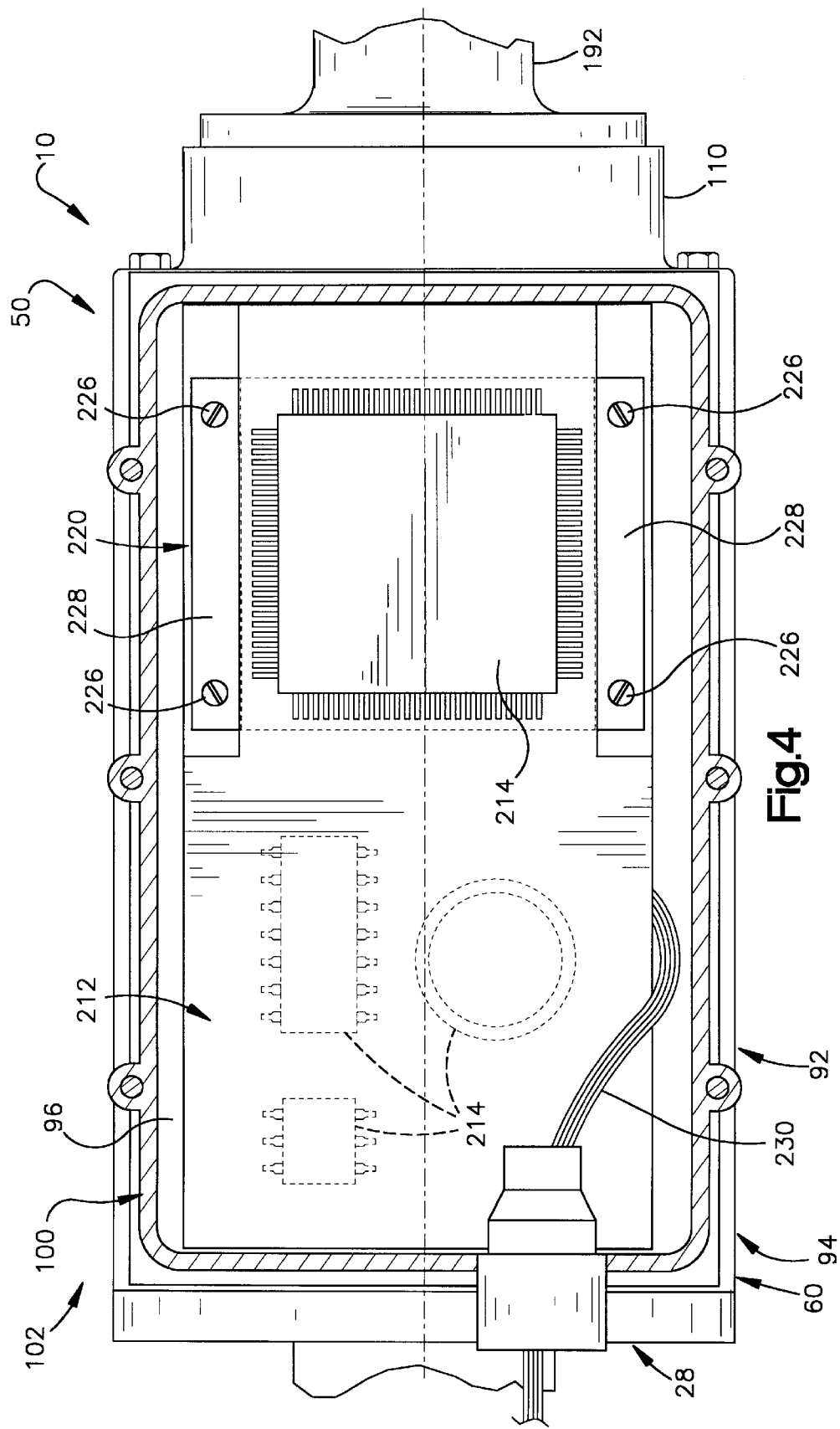
FIG. 4 is a view similar to FIG. 3 of the motor stator molded with a motor tube.

The stator windings 82 are placed or wound onto the stator core 72 after the motor housing 60 has been cast. The stator windings 82 are spaced apart from, and do not touch, the motor housing 60. The stator windings 82 have leads 85 (FIGS. 2 and 4) for connection with motor actuation circuitry of the vehicle. Inner portions 86 of the leads 85 are disposed radially inward of the second axial portion 66 of the motor housing 60. End portions 88 of the leads 85 extend out of the second axial portion 66 of the motor housing 60, through an opening 90, for connection with the vehicle electric circuitry.

An exterior part of the second axial portion 66 of the motor housing 60 is formed as an electronic control unit ("ECU") housing portion 92 of the motor housing. The ECU housing portion 92 includes a platform 94 (FIGS. 1–4). The platform 94 is a portion of the motor housing 60 adapted to support one or more heat-generating components of an ECU in a thermally conductive (heat sink) relationship.

The platform 94 subtends an arc of about 90 degrees about the axis 20. The platform 94 has a planar outer side surface 96. The outer side surface 96 extends perpendicular to a diameter of the motor 50.

The platform 94 is engageable by a cover 100 (FIGS. 3 and 4) for enclosing the ECU. The platform 94 and the cover 100 together form an ECU housing 102 of the motor 50. The opening 90 (FIG. 2) extends through the outer side surface 96 of the platform 94. The end portions 88 of the stator leads 85 project from the platform 94 through the opening 90.

An end cap 110 is fastened to the right end (as viewed in FIG. 1) of the motor housing 60. A metal insert 114 is press fitted in the end cap 110. The metal insert 114 (FIG. 2) has a cylindrical bearing surface 116 centered on the axis 20. An internal spanner nut thread 118 is formed on the metal insert 114 at a location axially outward of the bearing surface 116. An outboard housing 192 closes the right end (as viewed in FIG. 1) of the motor 50.

A rotor assembly 120 is disposed radially inward of the stator 70. The rotor assembly 120 includes a tubular, cylindrical rotor shaft 122 having a cylindrical central passage or opening 124. The rotor shaft 122 has a main body portion 126 and a thin-walled right end portion 128. A rotor 132 is press fit on the outside of the rotor shaft 122. The motor 50 also includes a motor position sensor indicated schematically at 130 (FIG. 1). The motor position sensor 130 includes a position sensor rotor 136 press fit on the left end (as viewed in FIG. 1) of the rotor shaft 122.

The ball nut assembly 52 (FIGS. 1–3) includes a ball nut 140 which is press fit inside the right end portion 128 of the rotor shaft 122. The ball nut 140 has an internal screw thread convolution 144. A first bearing 146 is press fit onto the ball nut 140.

During the process of assembling the motor 50, the stator windings 82 are placed or wound on the stator core 72 after the motor housing 60 is cast around the stator core. The rotor shaft 122 and the other parts which are rotatable with it, including the rotor 132, the ball nut 140, the first bearing 146, and the motor position sensor rotor 136, are slipped into the assembly of the motor housing 60 and the stator 70. The outer race of the first bearing 146 engages the cylindrical bearing surface 116 on the metal insert 114 in a radial force-transmitting relationship. The motor housing 60 and the first bearing 146 thus support the right hand end of the rotor assembly 120 for rotation relative to the stator 70. At this point in the manufacture of the steering assembly 10, the first bearing 146 is not supported axially in the motor housing 60.

The opposite end (the left end as viewed in FIG. 1) of the rotor assembly 120 is supported by the pinion housing 28 as follows. The pinion housing 28 includes a cast metal main body portion 160 (FIG. 1) which receives the pinion gear 30 and through which the rack portion 34 of the steering member 14 extends. The main body portion 160 of the pinion housing 28 has an extension portion 162 for connection with the motor housing 60.

A second bearing 170 is pressed into the extension portion 162 of the pinion housing 28. The second bearing 170 is supported both radially and axially in the main body portion 160 of the pinion housing 28.

A motor position sensor stator 174 (FIG. 2) is secured to the pinion housing 28 outward of the second bearing 170. The motor position sensor stator 174 cooperates with the motor position sensor rotor 136, in a known manner, to help control operation of the motor 50.

The assembly of the pinion housing 28 and its attached parts is fastened to the motor assembly including the stator 70, the rotor 132, and the ball nut 142. The pinion housing 28 is fastened directly to the motor housing 60. The mounting bolts 64 secure the pinion housing 28 to the motor housing 60.

A spanner nut 184 is then screwed into the spanner nut thread 118 on the metal insert 114 in the end cap. The spanner nut 184 is tightened down axially against the outer race of the first bearing 146. The engagement between the spanner nut 184 and the outer race of the first bearing 146 places an axial load on the first bearing. The axial load on the first bearing 146 is transmitted through the inner race of the first bearing to the ball nut 140. The first bearing 146 biases the ball nut 140 axially in a direction toward the second bearing 170.

The axial load on the ball nut 140 is transmitted into the rotor shaft 122. The axial load on the rotor shaft 122 is transmitted into the second bearing 170. The axial load on the second bearing 170 is transmitted to the extension portion 162 of the pinion housing 28. The second bearing 170 supports the left end of the rotor assembly 120 for rotation relative to the stator 70. The rotor assembly 120, at this point in the manufacture of the steering assembly 10, can now be turned relative to the stator 70.

The steering member 14 is inserted into the central opening 124 of the rotor shaft 126 of the motor 50. The ball nut assembly 52 extends around the screw portion 38 of the steering member 14. The ball nut assembly 52 includes a plurality of force-transmitting members in the form of balls 200 disposed between the internal thread 144 on the ball nut 140 and the external thread 40 on the screw portion 38 of the steering member 14. The balls 200 are loaded into the ball nut assembly 52 in a known manner. The ball nut 140 includes a recirculation passage (not shown) for recirculating the balls 200 upon axial movement of the steering member 14 relative to the ball nut.

A torque sensor indicated schematically at 180 in FIG. 1 is located in the pinion housing 28. The torque sensor 180 is operative to sense relative movement between the input shaft 26 and the pinion gear 30, to help control operation of the motor 50, in a known manner.

An ECU (electronic control unit) 210 is fastened to the platform 94 on the second axial portion 66 of the motor housing 60. The end portions 88 of the stator leads 84 are electrically connected with the ECU 210.

The ECU 210 (FIGS. 3 and 4) includes a printed circuit board 212 on which are mounted a plurality of electrical components (not shown in detail) such as those illustrated schematically at 214. The printed circuit board 212 is supported on the platform 94 in a position spaced apart from and electrically insulated from the outer side surface 96 and the other parts of the platform.

The ECU 210 also includes a power module 220. The power module 220 (shown only partially in FIG. 2) includes a plurality of switches in the form of power transistors, indicated schematically at 222 in FIG. 3. The power transistors may be, for example, MOSFET semiconductors.

The power module 220 is mounted directly on the outer side surface 96 of the platform 94, below the printed circuit board 212. The power module 220 is spaced apart from the printed circuit board 212. The power module 220 has a planar outer side surface 224 (FIG. 3) in abutting engagement with the planar outer side surface 96 of the platform 94. The power module 220 is thus in good thermal contact with the platform 94. A plurality of fasteners 226 such as screws extend through a mounting flange 228 of the power module 220 and secure the power module to the platform 94.

A connector cable 230 connects the ECU 210 with the torque sensor 180 and the motor position sensor 134. Upon rotation of the vehicle steering wheel 12 by the driver of the vehicle, the vehicle electric circuitry, including the ECU 210 and the torque sensor 180, determines whether the motor 50 should be operated to provide steering assist to move the steering member 14. If the motor 50 is operated, the rotor 132 is caused to rotate about the axis 20 relative to the stator 70. The rotor shaft 122 and the ball nut 140 rotate with the rotor 132. The balls 200 transmit the rotational force of the ball nut 140 to the screw portion 38 of the steering member 14. Because the ball nut 140 is fixed in position axially, the steering member 14 is driven to move axially in response, effecting steering movement of the steerable wheels of the vehicle as desired.

When the motor 50 is operated, the power module 220 generates a large amount of heat. The abutting engagement of the power module 220 with the platform 94 enables heat to be transferred directly from the power module 220 into the dense metal material of the platform. Because the platform 94 is cast as one piece with the other parts of the motor housing 60, the platform and the motor housing, as a whole, act as a heat sink for the power module 220. As a result, the power module 220 can run cooler, and no separate heat sink need be provided for the power module.

The material of the cast side wall 84 of the motor housing 60 fits intimately around the stacked laminations of the stator core 72. A machined metal motor housing for this application must have a tolerance of about plus or minus 0.001 inches, in order to achieve a secure press fit on the stator core. This is difficult to achieve with a machined metal motor housing, because the stack of laminations does not have a smooth outer surface but instead has a tolerance of about three to four thousandths of an inch. Also, the stack of laminations of the stator core 72 is about seven inches long, which makes machining a cylindrical inner surface, as part of a blind bore, difficult and expensive.

From the above description of the invention, those skilled in the art will perceive improvements, changes and modifications in the invention. Such improvements, changes and modifications within the skill of the art are intended to be covered by the appended claims.

Having described the invention, we claim:

1. A steering assembly for turning steerable wheels of a vehicle in response to rotation of a steering wheel of the vehicle, said steering assembly comprising:

a pinion;

a steering member which is movable axially to effect turning movement of the steerable wheels of the vehicle, said steering member having a rack portion extending in a longitudinal direction for engagement with said pinion and an externally threaded screw portion, the steering member being movable in said longitudinal direction;

an electric motor comprising a rotor drivingly connected to said steering member and a stator, said stator being arranged along said longitudinal direction of said rack portion, said stator, when energized, effecting rotation of said rotor and, thereby, movement of said steering member, said rotor being rotatable about an axis parallel to said longitudinal direction;

an electronic control unit extending longitudinally adjacent said stator for controlling operation of said electric motor, said electronic control unit including at least one heat-generating component; and a one-piece cast metal member made of a homogeneous material having a main body encapsulating and supporting said stator along said longitudinal direction and having an electronic control unit housing portion encapsulating and supporting said electronic control unit along said longitudinal direction;

said electronic control unit housing portion of said one-piece metal member including a platform, said platform being located between said stator and said at least one heat-generating component along said longitudinally extending direction, said platform having a planar surface and two end portions partially encapsulating said stator along said longitudinal direction, said end portions being spaced apart along said longitudinal direction, said at least one-heat generating component being fastened to said platform in a thermally conductive relationship.

2. A steering assembly as set forth in claim 1 wherein said platform has an outer side surface which extends generally perpendicular to a diameter of said motor.

3. A steering assembly as set forth in claim 1 wherein said one-piece metal member is made from aluminum.

4. A steering assembly as set forth in claim 1 wherein said at least one heat-generating component comprises at least one power transistor.

5. A steering assembly as set forth in claim 1 wherein said at least one heat-generating component comprises a power module.

6. A steering assembly as set forth in claim 5 wherein said power module has a planar surface in abutting engagement with a planar surface of said platform.

7. A steering assembly as set forth in claim 1 wherein said stator has wire leads for electrically connecting said stator to said electronic control unit, said wire leads projecting through an opening in said metal member for connection with the electronic control unit.

8. A steering assembly as set forth in claim 1 further comprising a ball nut extending around said screw portion of said steering member and having an internal thread, and a plurality of balls disposed between said internal thread on said ball nut and said external thread on said steering member for transmitting force between said ball nut and said screw portion of said steering member;

said steering assembly further comprising an end cap secured to said one-piece metal member, said end cap having portions supporting said ball nut for rotation with said rotor relative to said one-piece metal member.

9. A steering assembly as set forth in claim 1 wherein said one-piece metal member is an aluminum casting.

10. A steering assembly as set forth in claim 1 wherein said stator comprises a core and a series of windings on said core, said stator having a cylindrical rotor space at least partially defined by said stator core, said rotor being disposed in said rotor space, said rotor having an axially extending central passage, said steering member extending through said central passage in said rotor.

11. A steering assembly as set forth in claim 1 further comprising a cover connectable with said one-piece metal member and cooperating with said one-piece metal member to enclose said electronic control unit.

12. A steering assembly for turning steerable wheels of a vehicle in response to rotation of a steering wheel of the vehicle, said steering assembly comprising:

a pinion;

a steering member which is movable axially to effect turning movement of the steerable wheels of the vehicle, said steering member having a rack portion extending in a longitudinal direction for engagement with said pinion and an externally threaded screw portion, said steering member being movable in said longitudinal direction;

an electric motor comprising a rotor drivingly connected to said steering member and a stator, said stator being arranged along said longitudinal direction of said rack portion, said stator, when energized, effecting rotation of said rotor and, thereby, movement of said steering member, said rotor being rotatable about an axis parallel to said longitudinal direction;

an electronic control unit extending longitudinally adjacent said stator for controlling operation of said electric motor, said electronic control unit including at least one heat-generating component; and a one-piece cast metal member made of a homogeneous material having a main body portion encapsulating and supporting said stator along said longitudinal direction and having an electronic control unit housing portion encapsulating and supporting said electronic control unit along said longitudinal direction;

said electronic control unit housing portion of said one-piece metal member having first and second planar surfaces and two end portions, said first and second planar surfaces being located between said stator and said at least one heat-generating component along said longitudinally extending direction, said second planar surface and said two end portions partially encapsulating said stator along said longitudinal direction, said end portions being spaced apart along said longitudinal direction.

* * * * *